US007228635B2

(12) United States Patent
Jian et al.

(10) Patent No.: US 7,228,635 B2
(45) Date of Patent: Jun. 12, 2007

(54) LASER TILT APPARATUS AND THE METHOD THEREOF

(75) Inventors: Zhang-Yong Jian, Hang-Zhou (CN); Yue-Ye Chen, Hang-Zhou (CN); Yong-Ce Qi, Hang-Zhou (CN); Yi-Qi Li, Hang-Zhou (CN); Hua-Tang Liu, Taichung (TW); Han Lu, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 90 days.

(21) Appl. No.: 11/165,375

(22) Filed: Jun. 23, 2005

(65) Prior Publication Data

US 2006/0168829 A1 Aug. 3, 2006

(30) Foreign Application Priority Data

Feb. 3, 2005 (TW) .............................. 94103436 A (51) Int. Cl.
*G01C 5/02* (2006.01)
(52) U.S. Cl. ................................... 33/291; 33/DIG. 21
(58) Field of Classification Search ................. 33/286, 33/290, 291, DIG. 21
See application file for complete search history.

(56) References Cited

U.S. PATENT DOCUMENTS

| | | | | |
|---|---|---|---|---|
| 5,533,268 A | * | 7/1996 | Keightley ..................... 33/290 |
| 5,636,018 A | * | 6/1997 | Hirano et al. ................. 33/291 |
| 5,742,387 A | * | 4/1998 | Ammann ....................... 33/290 |
| 6,035,540 A | * | 3/2000 | Wu et al. ....................... 33/286 |
| 6,314,651 B1 | * | 11/2001 | Ohtomo et al. ............... 33/290 |
| 2003/0229996 A1 | * | 12/2003 | Tamamura .................... 33/286 |
| 2005/0172503 A1 | * | 8/2005 | Kumagai et al. ............. 33/290 |
| 2005/0188555 A1 | * | 9/2005 | Hung ............................ 33/286 |
| 2006/0090357 A1 | * | 5/2006 | Wuersch et al. .............. 33/290 |
| 2006/0242850 A1 | * | 11/2006 | Ammann et al. ............. 33/290 |

* cited by examiner

*Primary Examiner*—G. Bradley Bennett
(74) *Attorney, Agent, or Firm*—Thomas, Kayden, Horstemeyer & Risley (57) ABSTRACT

The present invention discloses a laser tilt apparatus and the method thereof. The present invention comprises an input device, a tilt sensor, a motor, a microcontroller unit, and at least a laser module. The input device is used to input a tilt value. The tilt sensor supplies a tilt signal to represent the levelness of the laser tilt apparatus. The motor, electrically connected to the tilt sensor, adjusts the levelness of the laser tilt apparatus. The microcontroller unit samples the tilt signal to judge the levelness of the laser tilt apparatus. When leveling, the microcontroller unit drives the motor to adjust the tilt apparatus until the tilt signal matches the tilt value. After adjusting, the power supplied to the tilt sensor and the motor is suspended. The laser module is used to transmit laser light.

15 Claims, 6 Drawing Sheets

LASER TILT APPARATUS AND THE METHOD THEREOF

RELATED APPLICATIONS

The present application is based on, and claims priority from, Taiwan Application Serial Number 94103436, filed Feb. 3, 2005, the disclosure of which is hereby incorporated by reference herein in its entirety.

FIELD OF THE INVENTION

The present invention relates to a laser tilt apparatus and the method thereof, and more particularly, to a laser tilt apparatus with an intermittent power-supplying mode and the method thereof.

BACKGROUND OF THE INVENTION

Figure 1:
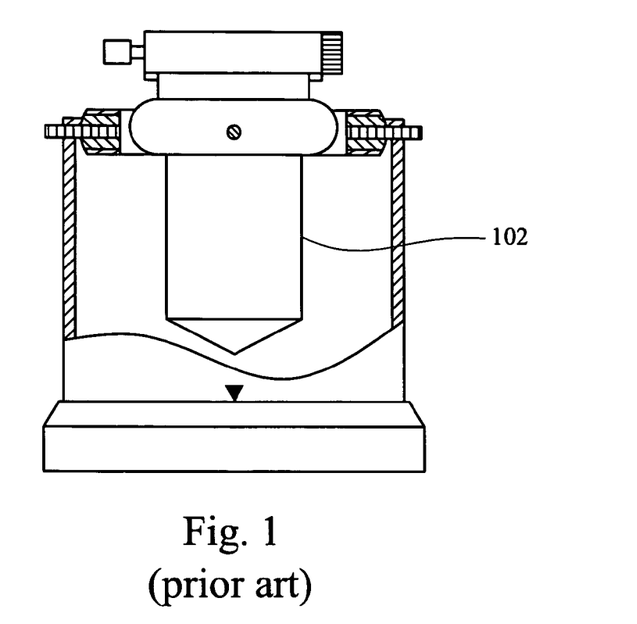
FIG. 1 is a schematic diagram of a conventional leveling device in a tilt meter.

In architecture, when demarcating moldings and leveling the ceiling with the ground, keeping a tilt meter horizontal to the ground all the time is an important issue. Reference is made to FIG. 1 illustrating a conventional leveling device in a tilt meter. As shown in FIG. 1, the plumb 102 is always perpendicular to the horizontal by gravity. Such a tilt meter can be used on any kind of ground, and since the plumb 102 is always perpendicular to the horizontal by gravity, the laser scanning apparatus associated with the plumb can indicate the horizontal status precisely. Although determining the horizontal by the plumb is a simple and effective method, the horizontal status can be acquired only after the swinging plumb becomes still. The usefulness of this kind of leveling device is therefore not optimum. Furthermore, the location of the plumb 102 of the conventional leveling device is not stationary during use. Thus, the laser beam at a distance trembles and the precision of the device is thus adversely affected.

Figure 2:
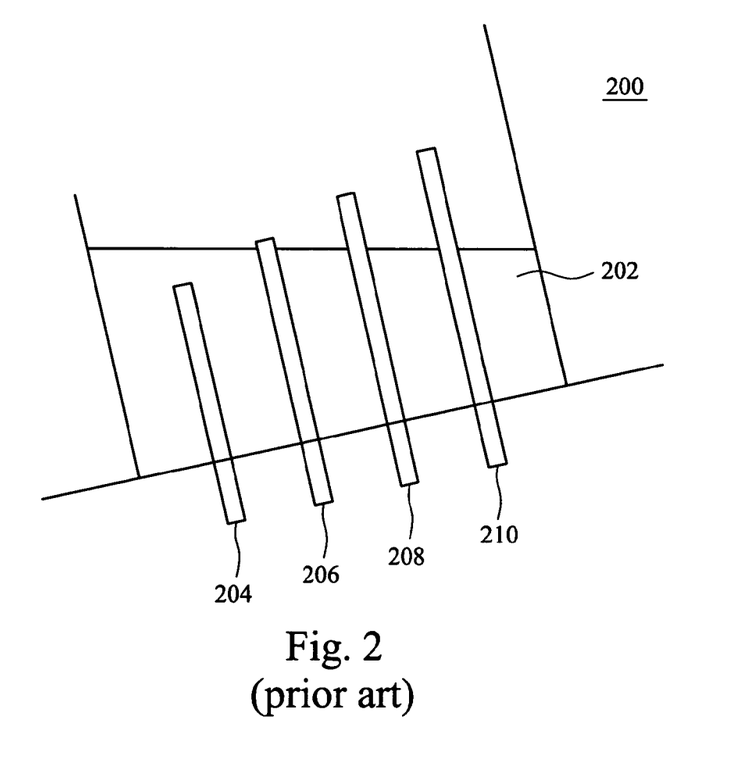
FIG. 2 illustrates how the tilt sensor works.

Another kind of laser tilt meter exists which determines the horizontal by using a level-adjusting apparatus comprising a tilt sensor associated with a laser transmitter to project horizontal rays of light. Tilt sensors can be classified into two kinds: the single-axis tilt sensor and the dual-axis tilt sensor. The single-axis tilt sensor measures the slant of one direction, whereas the dual-axis one estimates the slant of a plane. How the tilt sensor works is illustrated in FIG. 2. It is known that the conductivity between two electrodes is proportional to the length of electrode immersed in an electrolyte. Even if the ground is not horizontal, the surface of the electrolyte in the tilt sensor remains level due to gravity. The electrolyte is electrically conductive, and since the conductivity between the two electrodes is proportional to the length of electrode immersed in the electrolyte, the resistance changes in proportion to the tilt angle. Therefore, the slant of the tilt sensor is derived from the resistance corresponding to the tilt angle.

However, in the level-adjusting apparatus, if the tilt sensor has been used for a long time, it will become unstable and consume more power. Furthermore, the present laser tilt meters do not have laser-beam-locking functionality. When the user moves the level-adjusting apparatus, the system self-adjusts automatically and points to the level again. Therefore, the apparatus cannot be used in other applications.

SUMMARY OF THE INVENTION

Therefore, one objective of the present invention is to provide a laser tilt apparatus and the method thereof in which the tilt apparatus is more stable and power-saving.

Another objective of the present invention is to provide a laser tilt apparatus and the method thereof in which the laser beam projected from the laser tilt apparatus can be locked at any angle needed by the user.

According to the aforementioned objectives, the present invention provides a laser tilt apparatus comprising an input device, a tilt sensor, a motor, a microcontroller unit, and at least a laser module. The input device is used to input a tilt value. The tilt sensor supplies a tilt signal to represent the levelness of the laser tilt apparatus. The motor, electrically connected to the tilt sensor, adjusts the levelness of the laser tilt apparatus. The microcontroller unit samples the tilt signal to judge the levelness of the laser tilt apparatus. When leveling, the microcontroller unit converts the tilt value to the corresponding tilt signal and drives the motor to adjust the tilt apparatus until the tilt signal matches the tilt value. After adjusting, the power supplying the tilt sensor and the motor is suspended. The laser module is used to transmit laser light.

According to the preferred embodiment of the present invention, the tilt sensor can be an electrolytic tilt sensor, a capacitor tilt sensor, or any other tilt sensor that can sense levelness. The laser beam can comprise one or a plurality of beams, each beam set at any angle with respect to the laser tilt apparatus.

According to another objective, the present invention provides an operation method of a laser tilt apparatus, wherein the laser tilt apparatus comprises a tilt sensor, a motor, a microcontroller unit, and at least a laser module. The operation method of the laser tilt apparatus comprises the following steps. First, power is supplied to the laser tilt apparatus. Then, a first sampling step is proceeded to sample a plurality of output signals from the tilt sensor. A first judging step is then proceeded to check if the tilt sensor is level. If the tilt sensor is not level, the microcontroller unit drives the motor to adjust the tilt sensor until it is level by successively repeating the first sampling step and first judging step. If the tilt sensor is level, a second judging step is proceeded to determine if a locking function is being proceeded. If the locking function is not being proceeded, the power to the tilt sensor and the motor is suspended. If the locking function is being proceeded, a tilt value is set and converted to a corresponding tilt signal.

Then, a first adjusting step is proceeded to drive the motor to adjust the laser tilt apparatus until the tilt signal matches the tilt value. A third judging step is then proceeded to confirm if the tilt angle of the laser tilt apparatus equals the tilt value to determine if the locking function is being ended. If the locking function is not being ended, the first judging step is repeated until the locking function has ended. If the locking function has ended, the power to the tilt sensor and the motor is suspended after determining the number of laser beams in the laser module to activate.

According to the preferred embodiment of the present invention, the step of proceeding the locking function, setting the tilt value and converting the tilt value to the corresponding tilt signal is by referencing a conversion table of tilt values versus tilt signals. The conversion table is preset in the microcontroller unit. Furthermore, the method further comprises proceeding a second sampling step and a fourth judging step to confirm if the tilt sensor is level after proceeding the first judging step. The method also comprises waiting for a first predetermined period of time to let the tilt sensor stabilize after the step of supplying power to the laser tilt apparatus as well as re-supplying the power to the laser tilt apparatus after suspending the power to the tilt sensor and the motor for a second predetermined period of time.

In the preferred embodiment of the present invention, the laser beam is selected from the group consisting of a horizontal laser beam, an oblique laser beam, a horizontal round surface of a laser beam, an oblique round surface of a laser beam, a vertical laser beam, two vertical laser beams perpendicular to one another, two horizontal laser beams perpendicular to one another, a ground-oriented laser beam, and any arbitrary combination thereof. The tilt sensor can be an electrolytic tilt sensor, a capacitor tilt sensor, or any other tilt sensor that can sense levelness.

According to the objectives, the present invention provides an operation method of a laser tilt apparatus, wherein the laser tilt apparatus comprises a tilt sensor, a motor, a microcontroller unit, and at least a laser module. The laser module can project at least a laser beam. The operation method of the laser tilt apparatus comprises the following steps. First, power is supplied to the laser tilt apparatus. Then, a first sampling step is proceeded to sample a plurality of output signals from the tilt sensor. A first judging step is then proceeded to check if the tilt sensor is level. If the tilt sensor is not level, the microcontroller unit drives the motor to adjust the tilt sensor until it is level by successively repeating the first sampling step and first judging step. If the tilt sensor is level, the power to the tilt sensor and the motor is suspended. The power is re-supplied to the tilt sensor and the motor after waiting for a predetermined period of time, preferably 1200 ms.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention discloses a laser tilt apparatus and the method thereof, which is suitable for a laser tilt meter and an angle-estimating meter. By intermittently supplying power to the tilt sensor of the tilt apparatus, not only is the stability of the tilt apparatus raised, but power is also conserved. In addition, by intermittently supplying power to the tilt sensor and the motor, the tilt angle of the tilt apparatus can be locked and a user can transfer it to other applications. In order to make the illustration of the present invention more explicit and complete, the following description is stated with reference to FIGS. 3 through 6*b*.

The laser tilt apparatus of the present invention is composed of three parts: the outer part, the electric part, and the body. The outer part is composed of the outer shell and the operation panel. The electric part is mainly composed of the level-adjusting apparatus and the power source. The level-adjusting apparatus comprises a tilt sensor, a signal-generating module, a sample-and-hold module, a differential module, a microcontroller unit, and a motor. The body is composed of a horizontal laser module, a vertical laser module, a ground-oriented laser module, and an adjusting platen. The microcontroller unit samples the processed signals from the tilt sensor, and controls the motor to adjust the tilt sensor until it is level. The laser module mode is set by the user.

Figure 3:
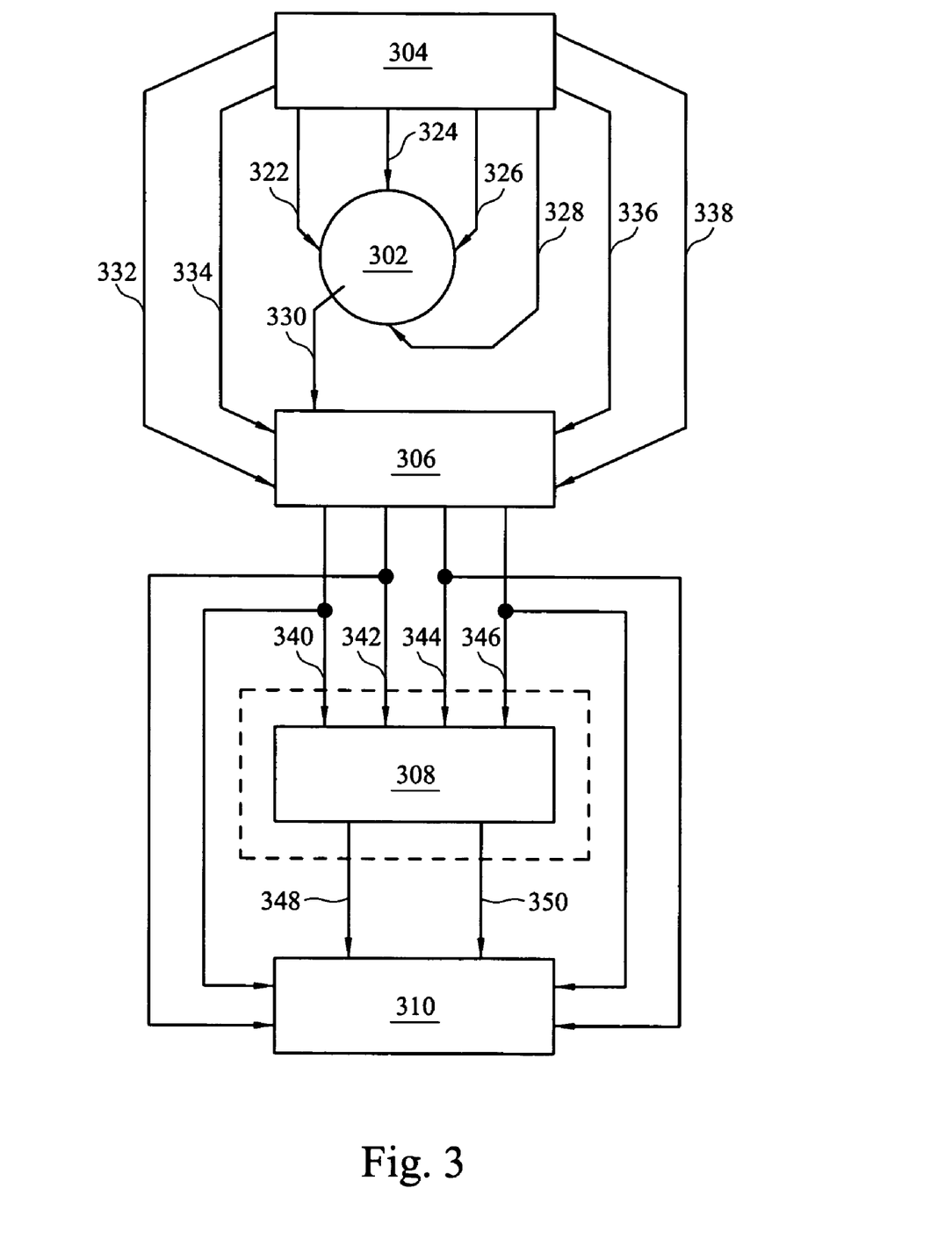
FIG. 3 is a block diagram of the level-adjusting apparatus of the laser tilt apparatus according to the preferred embodiment of the present invention.
Figure 4:
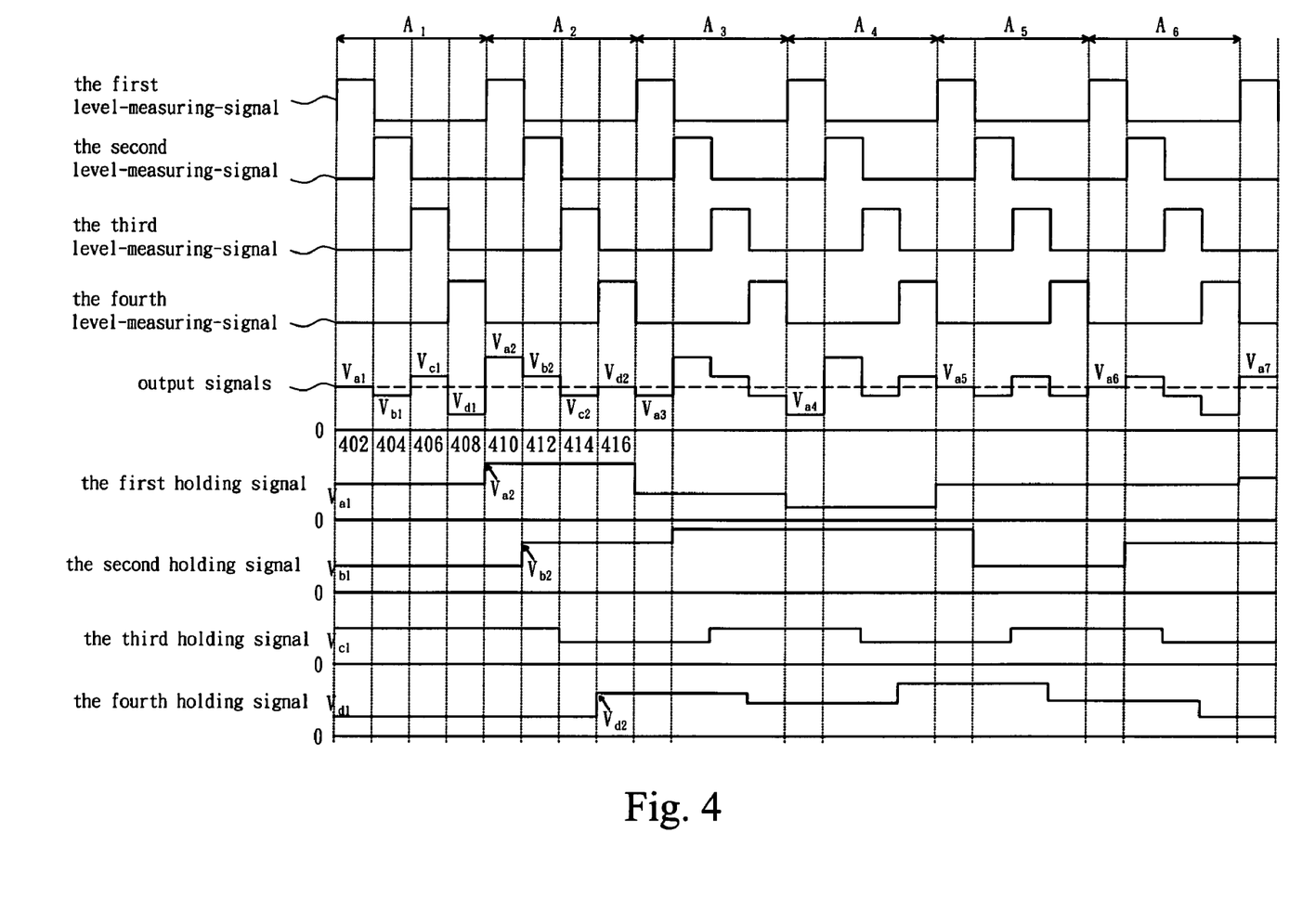
FIG. 4 is a diagram of the signals of the level-adjusting apparatus of the laser tilt apparatus according to the preferred embodiment of the present invention.

FIG. 3 is a block diagram of the level-adjusting apparatus of the laser tilt apparatus according to the preferred embodiment of the present invention, and FIG. 4 is a diagram of the signals of the level-adjusting apparatus of the laser tilt apparatus according to the preferred embodiment of the present invention. The level-adjusting apparatus in the preferred embodiment of the present invention comprises a tilt sensor 302, a signal-generating module 304, a sample-and-hold module 306, a differential module 308, a microcontroller unit 310, and a motor (not shown in the drawings).

As shown in FIG. 3, first, the signal-generating module 304 regularly generates a plurality of level-measuring signals with equal intervals. The level-measuring signals are the first level-measuring signal 322, the second level-measuring signal 324, the third level-measuring signal 326, and the fourth level-measuring signal 328. These level-measuring signals have the same time sequence and pulse width and are spaced at one or a plurality of intervals. The level-measuring signals are positive pulses, negative pulses or both positive and negative pulses. They are alternately and multi-directionally sent to the first input pin A, the second input pin B, the third input pin C, and the fourth input pin D of the dual-axis tilt sensor 302 in turn, respectively. The first and the third input pins are set opposite to the second and the fourth input pins. As shown in FIG. 4, according to the level-measuring signals, the output pin of the tilt sensor generates a series of output signals 330 comprising the first measuring cycle A1, the second measuring cycle A2, the third measuring cycle A3, the fourth measuring cycle A4, the fifth measuring cycle A5, and the sixth measuring cycle A6 in every cycle of the series of output signals. The output signals in each measuring cycle contain a first output signal 402, a second output signal 404, a third output signal 406, and a fourth output signal 408. The first and the third input pins output signals containing the tilt information of one direction via the output pin of the dual-axis tilt sensor 302, while the second and the fourth input pins output signals containing the tilt information of the other direction via the output pin of the dual-axis tilt sensor 302. That is, the series of output signals 330 from the output pin includes the tilt information of two directions.

Simultaneously, these level-measuring signals are also sent to the sample-and-hold module 306 as trigger signals 332, 334, 336 and 338 for sampling and holding the first output signal 402, the second output signal 404, the third output signal 406, and the fourth output signal 408, respectively. Thus, the holding signals 340, 342, 344 and 346 corresponding to the level-measuring signals 322, 324, 326 and 328 are separated.

The following describes in detail the method of sampling and holding the series of output signals 330 to divide the holding signals. As shown in the drawings, the first level-measuring signal 322, the second level-measuring signal 324, the third level-measuring signal 326, and the fourth level-measuring signal 328 have the same time sequence and are spaced at one interval and are alternately sent to each input pin of the dual-axis tilt sensor 302 in turn, respectively. Therefore, in the first cycle A1, taking the first level-measuring signal 322 as an example, if the first output signal 402 as shown in FIG. 4 is generated from the output pin of the dual-axis tilt sensor 302 in accordance with the tilt condition, the first output signal 402 going through the sample-and-hold module 306 is divided into the first holding signal 340 of which the voltage is equal to Va1 in the first output signal 402. The sample-and-hold module 306 keeps the voltage Va1 of the first holding signal 340 until the second cycle A2 and then changes to the voltage Va2 of the first output signal 410 in the second cycle A2. The voltage variation of the output signal in every cycle represents the voltage variation of the input pins according to the slant status. Similarly, the second holding signal 342, the third holding signal 344, and the fourth holding signal 346 can also be obtained. That is, the variation of voltage according to the slant status evaluated by the input pins can be acquired.

Referring again to FIG. 3, the first holding signal 340, the second holding signal 342, the third holding signal 344, and the fourth holding signal 346 are sent to the differential module 308 to differentiate the holding signals (340 and 344, or 342 and 346) of the same direction. The first holding signal 340 and the third holding signal 344 are differentiated to get the first level-estimating-result signal 348, whereas the second holding signal 342 and the fourth holding signal 346 are differentiated to get the second level-estimating-result signal 350. When the tilt sensor is horizontal, the level-estimating-result signals are supposed to be zero, but to prevent any malfunction in processing the zero signals in the microcontroller unit 310, a voltage Va is added to the holding signals of the same direction (A-C or B-D) to make the differential module 308 output a fixed voltage Va even though the tilt meter is level. The formulas for differentiating are Adata+Va−Cdata=OutData, and Bdata+Va−Ddata=OutData. When level, Adata=Cdata and Bdata=Ddata, where Adata, Bdata, Cdata and Ddata are the first holding signal 340, the second holding signal 342, the third holding signal 344, and the fourth holding signal 346, respectively. OutData is the first level-estimating-result signal 348 or the second level-estimating-result signal 350.

The aforementioned differential module 308 can be a differential amplifier or a subtracter. Otherwise, the differential module 308 can be omitted and the first holding signal 340, the second holding signal 342, the third holding signal 344, and the fourth holding signal 346 can be sent directly to the microcontroller unit 310 for differentiation. The level signal of at least one direction can be acquired by differentiating the tilt signal output from the tilt sensor 302. The output from the tilt sensor 302 is called the tilt signals in the following steps.

Figure 5:
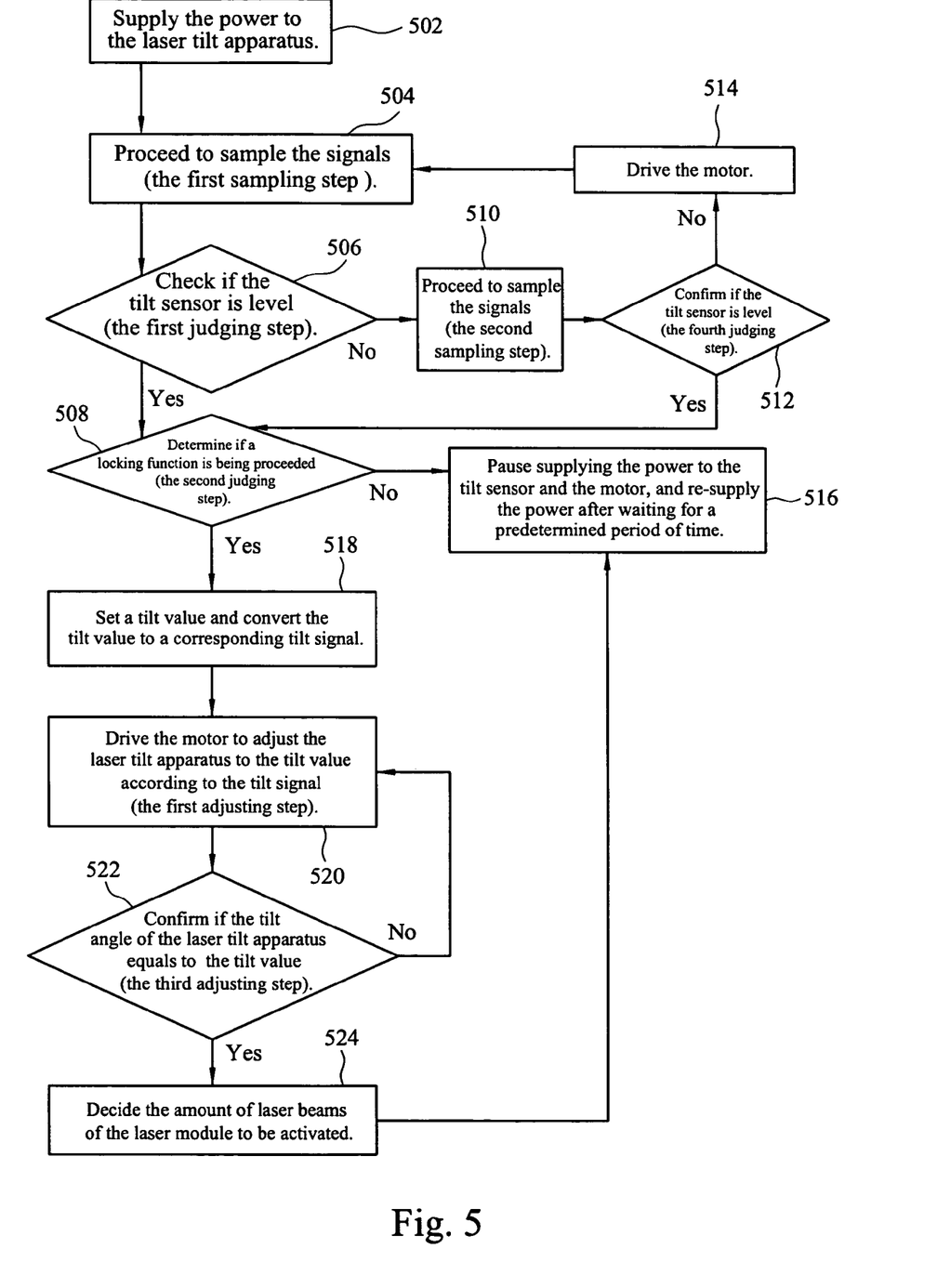
FIG. 5 illustrates the operation method of the laser tilt apparatus according to the preferred embodiment of the present invention.

Reference is made to FIG. 5 illustrating the operation method of the laser tilt apparatus according to the preferred embodiment of the present invention. After supplying the power to the laser tilt apparatus, the system keeps supplying power for a period of time, about 400 ms in the preferred embodiment. The time is for the tilt sensor of the laser tilt apparatus to become stable in adjusting the tilt apparatus to be level. Then, a first sampling step 504 is proceeded to sample the output signals from the tilt sensor and a first judging step 506 is started to check if the tilt sensor is level.

If the tilt sensor is level, a second judging step 508 is started to determine if a locking function is being proceeded. If the tilt sensor is not level, one more signal sampling (a second sampling step 510) is taken and a fourth judging step 512 is proceeded to confirm if the tilt sensor is level. If the tilt sensor is confirmed to be level, then, the second judging step 508 is proceeded again. If the tilt sensor is confirmed to not be level, the microcontroller unit drives a motor in step 514 to adjust the tilt sensor until it is level by repeating steps 504 and 506 (the first sampling step and the first judging step).

If the locking function is not being proceeded as determined by the second judging step 508, the power to the tilt sensor and the motor is suspended and re-supplied after waiting for a predetermined period of time as shown in step 516. If the locking function is being proceeded, a tilt value is set and the microcontroller unit converts the tilt value to a corresponding tilt signal according to the conversion table of tilt values versus tilt signals preset in the microcontroller unit. Then, in step 520, the motor is driven to adjust the laser tilt apparatus to the tilt value according to the tilt signal (the first adjusting step). In step 522, a third judging step is started to confirm if the tilt angle of the laser tilt apparatus equals the tilt value to determine if the locking function is being ended. If the locking function is not being ended, step 520 is proceeded again and the first adjusting step until the locking function has ended. If the locking function has ended, step 516 is proceeded again to suspend the power to the tilt sensor and the motor after determining the number of laser beams in the laser module to activate. After suspending the power to the tilt sensor and the motor for a predetermined period of time, the power is re-supplied to the laser tilt apparatus.

After suspending the power to the tilt sensor and the motor for a predetermined period of time, the power is re-supplied to the tilt sensor and the motor, and the aforementioned steps are repeated. In the preferred embodiment, the predetermined period of time is 1200 ms. It is noted that the time aforementioned can be set by the user and is not limited to 400 ms and 1200 ms.

Hence, a feature of the present invention is that when the tilt apparatus is adjusted to be level, the intermittent power-supplying mode is started. Thus, the tilt apparatus is made more stable and saves more power.

Another feature of the present invention is that the power is intermittently supplied to the tilt sensor and the motor to fix the laser beam at any angle needed by the user when the tilt apparatus is locked.

Figure 6A:
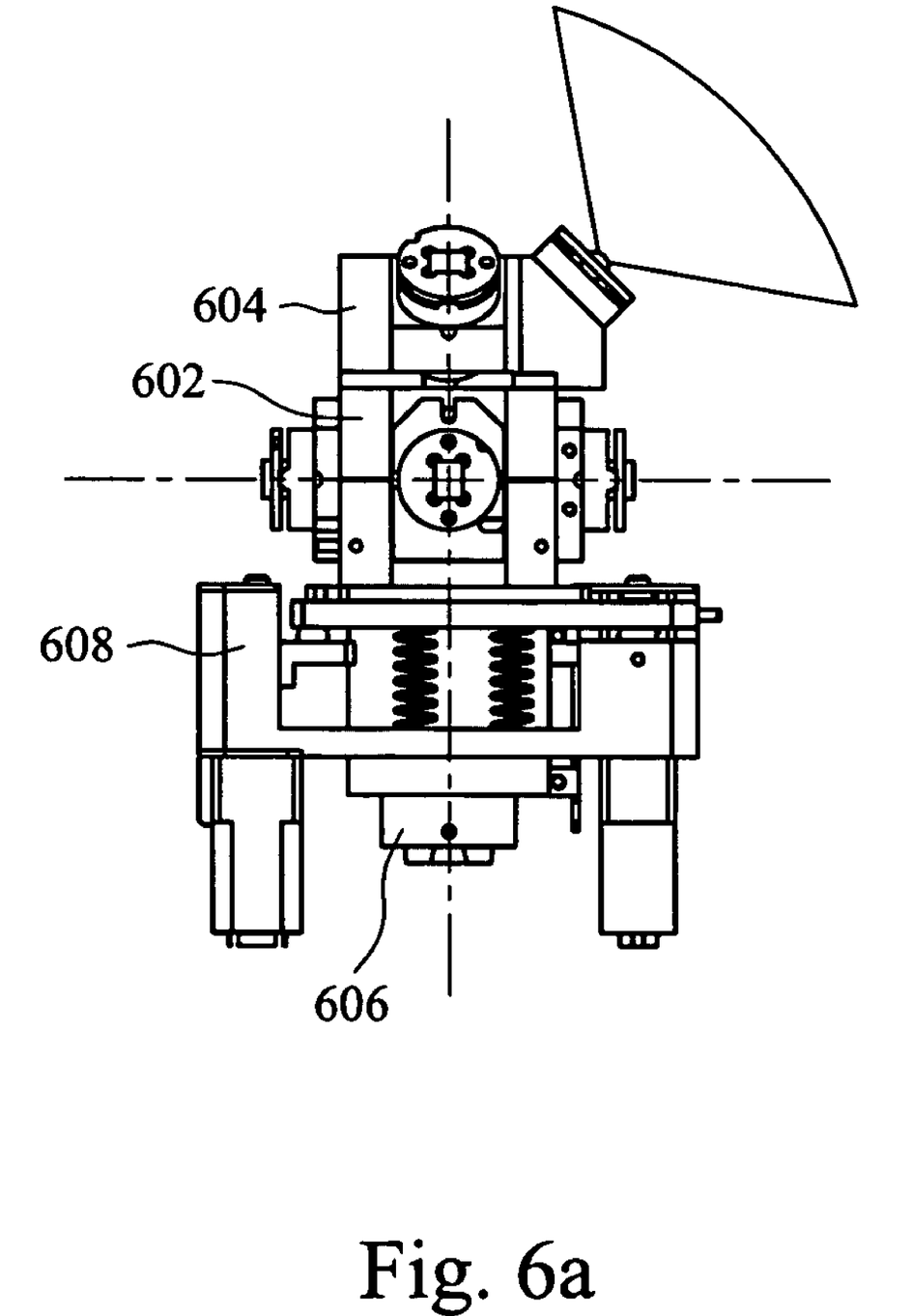
FIG. 6*a* and FIG. 6*b* illustrate the body of the laser tilt apparatus according to the preferred embodiment of the present invention.
Figure 6B:
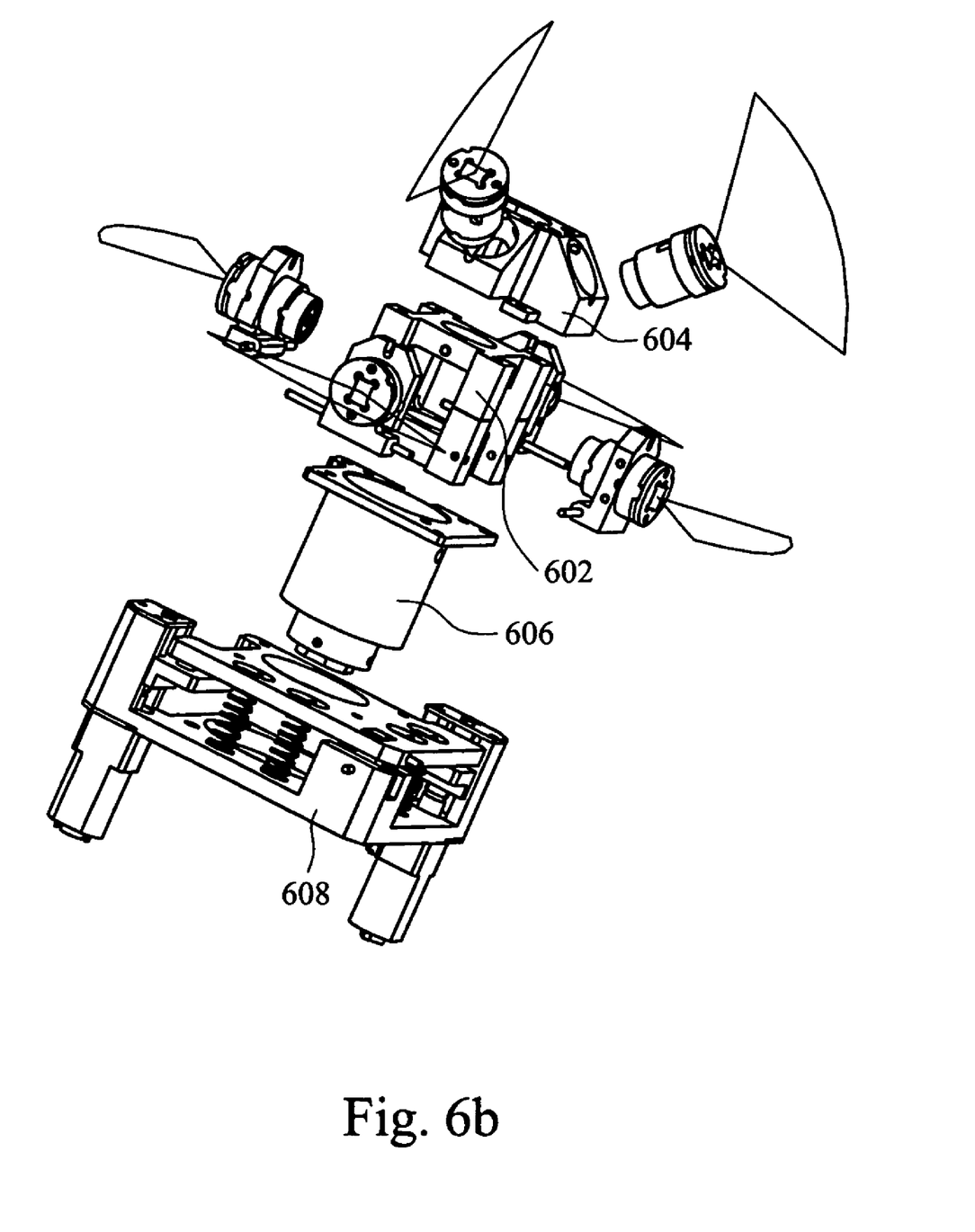

Reference is made to FIG. 6a and FIG. 6b, which illustrate the body of the laser tilt apparatus according to the preferred embodiment of the present invention. As shown in the drawings, the body of the laser tilt apparatus of the preferred embodiment of the present invention is composed of a horizontal laser module 602, a vertical laser module 604, a ground-oriented laser module 606, and an adjusting platen 608. Therefore, in the preferred embodiment of the present invention, the laser beams projected from the laser module include the horizontal laser beam, the vertical laser beam, the ground-oriented laser beam, and the arbitrary combination thereof. The horizontal laser module 602 has four laser projectors that can project four laser beams of which the projection angle can be greater than 90 degrees, when combining two of the beams, two horizontal laser beams (a first horizontal laser beam and a second horizontal laser beam) of which the projection angle is greater than 180 degrees. Furthermore, when the two horizontal laser beams are projected at the same time, they are a horizontal round surface of laser light spanning 360 degrees. The vertical laser module 604 has two laser projectors that can project two vertical laser beams (a first vertical laser beam and a second vertical laser beam) that are perpendicular to one another. The ground-oriented laser module 606 projects a ground-oriented laser beam that is a laser-spot on the ground. The laser-spot on the ground is the intersection spot of the two vertical laser beams (the first vertical laser beam and the second vertical laser beam) on the ground.

Therefore, in the preferred embodiment of the present invention, when the user chooses the kind and number of laser beams, the user can activate or shut down the first horizontal laser beam and/or the second horizontal laser beam, the first vertical laser beam and/or the second vertical laser beam, and the ground-oriented laser beam. Hence, the user can choose the first horizontal laser beam, the second horizontal laser beam, the first vertical laser beam, the second vertical laser beam, the ground-oriented laser beam and any combination thereof according to the needs. The laser beams can be set to a straight or oblique laser beam of any angle to form a horizontal laser beam (or an oblique laser beam), a vertical laser beam, a horizontal round surface of laser light of 360 degrees (or an oblique round surface of laser light), two vertical laser beams (or two straight line of laser beams) perpendicular to one another, a vertical laser beam with a horizontal round surface of laser light of 360 degrees (or an oblique round surface of laser light with a straight line of laser light perpendicular to the oblique round surface), a horizontal laser beam with two vertical laser beams perpendicular to one another (or an oblique laser beam with two straight laser beams perpendicular to one another and to the oblique laser beam), and two vertical laser beams perpendicular to one another with a horizontal round surface of laser light of 360 degrees (or an oblique round surface of laser light with two straight lines of laser light perpendicular to one another and to the oblique round surface). In the preferred embodiment of the present invention, the laser beam can comprise one or a plurality of beams, each beam set at any angle with respect to the laser tilt apparatus.

It is noted that the locking function and the determination of the laser module is independent in the actual operation. That is, as soon as either one is activated, the system responds immediately, and no sequence is needed. Therefore, in other embodiments, the user may also choose the laser module first and then determine the use of the locking function.

According to the aforementioned description, one advantage of the present invention is that when the tilt apparatus is adjusted to be level, the intermittent power-supplying mode is started. Thus, the tilt apparatus is more stable and saves more power.

According to the aforementioned description, yet another advantage of the present invention is that the laser tilt apparatus of the present invention may not only project the horizontal laser beam, the vertical laser beam, and the ground-oriented laser beam, but also supply a locking function that broadens the applicability of the tilt apparatus, supplying the user with a line of laser beams of any angle, a cross of laser beams and a face of laser beams sweeping 360 degrees.

According to the aforementioned description, a further advantage of the present invention is that the horizontal laser beam, the vertical laser beam, and the ground-oriented laser beam are independent to one another, and the user can choose the laser beam that is needed, thus providing convenience and saving power.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A laser tilt apparatus, comprising: an input device, for inputting a tilt value; a tilt sensor, for supplying a tilt signal to represent the levelness of the laser tilt apparatus; a motor, electrically connected to the tilt sensor, the motor adjusting the levelness of the laser tilt apparatus; a microcontroller unit, for sampling the tilt signal to judge the levelness of the laser tilt apparatus, and when the laser tilt apparatus is level, the microcontroller unit further transferring the tilt value to the corresponding tilt signal and driving the motor to adjust the laser tilt apparatus until the tilt value matches the tilt signal, and after adjusting, suspending the power to the tilt sensor and the motor; and at least a laser module, for transmitting at least a laser beam.

2. The laser tilt apparatus according to claim 1, wherein the tilt sensor is an electrolytic tilt sensor or a capacitor tilt sensor.

3. The laser tilt apparatus according to claim 1, wherein the laser beam is selected from the group consisting of a horizontal laser beam, an oblique laser beam, a horizontal round surface of a laser beam, an oblique round surface of a laser beam, a vertical laser beam, two vertical laser beams perpendicular to one another, two straight lines of laser beams perpendicular to one another, a ground-oriented laser beam, and any arbitrary combination thereof.

4. An operation method of a laser tilt apparatus, wherein the laser tilt apparatus comprises a tilt sensor, a motor, a microcontroller unit, and at least a laser module, the operation method of the laser tilt apparatus comprising: supplying power to the laser tilt apparatus; proceeding a first sampling step to sample a plurality of output signals from the tilt sensor; proceeding a first judging step to check if the tilt sensor is level; if the tilt sensor is not level, the microcontroller unit driving the motor to adjust the tilt sensor to become level by repeating the first sampling step and the first judging step until the tilt sensor is level; if the tilt sensor is level, proceeding a second judging step to determine if a locking function is being proceeded; if the locking function is not being proceeded, suspending the power to the tilt sensor and the motor; if the locking function is being proceeded, setting a tilt value and converting the tilt value to a corresponding tilt signal; proceeding a first adjusting step to drive the motor to adjust the laser tilt apparatus until the tilt signal matches the tilt value; proceeding a third judging step to confirm if the tilt angle of the laser tilt apparatus equals the tilt value to determine if the locking function is being ended; if the locking function is not being ended, repeating the first judging step until the locking function is being ended; and if the locking function is being ended, suspending the power to the tilt sensor and the motor after determining the number of laser beams in the laser module to activate.

5. The operation method of the laser tilt apparatus according to claim 4, wherein the laser beam is selected from the group consisting of a horizontal laser beam, an oblique laser beam, a horizontal round surface of a laser beam, an oblique round surface of a laser beam, a vertical laser beam, two vertical laser beams perpendicular to one another, two straight lines of laser beams perpendicular to one another, a ground-oriented laser beam, and the arbitrary combination thereof.

6. The operation method of the laser tilt apparatus according to claim 4, further comprising proceeding a second sampling step and a fourth judging step to confirm if the tilt sensor is level after proceeding the first judging step.

7. The operation method of the laser tilt apparatus according to claim 4, wherein the step of proceeding the locking function, setting the tilt value and converting the tilt value to a corresponding tilt signal is by referencing a conversion table of tilt values versus tilt signals.

8. The operation method of the laser tilt apparatus according to claim 7, wherein the conversion table is preset in the microcontroller unit.

9. The operation method of the laser tilt apparatus according to claim 4, further comprising waiting for a first predetermined period of time to let the tilt sensor to become stable after the step of supplying the power to the laser tilt apparatus.

10. The operation method of the laser tilt apparatus according to claim 9, wherein the first predetermined period of time is 400 ms.

11. The operation method of the laser tilt apparatus according to claim 4, further comprising re-supplying the power to the laser tilt apparatus after suspending the power to the tilt sensor and the motor for a second predetermined period of time.

12. The operation method of the laser tilt apparatus according to claim 11, wherein the second predetermined period of time is 1200 ms.

13. The operation method of the laser tilt apparatus according to claim 4, wherein the tilt sensor is an electrolytic tilt sensor or a capacitor tilt sensor.

14. An operation method of a laser tilt apparatus, wherein the laser tilt apparatus comprises a tilt sensor, a motor, a microcontroller unit, and at least a laser module, the operation method of the laser tilt apparatus comprising: supplying the power to the laser tilt apparatus; proceeding a first sampling step to sample a plurality of output signals from the tilt sensor; proceeding a first judging step to check if the tilt sensor is level; if the tilt sensor is not level, the microcontroller unit driving the motor to adjust the tilt sensor to become level by repeating the first sampling step and the first judging step until the tilt sensor is level, and then, suspending the power to the tilt sensor and the motor; if the tilt sensor is level, suspending the power to the tilt sensor and the motor; and re-supplying the power to the tilt sensor and the motor after waiting for a predetermined period of time.

15. The operation method of the laser tilt apparatus according to claim 14, wherein the predetermined period of time is 1200 ms.

* * * * *